United States Patent [19]

Watanabe

[11] Patent Number: 4,768,841
[45] Date of Patent: Sep. 6, 1988

[54] BRAKE CONTROL DEVICE

[75] Inventor: Namio Watanabe, Saitama, Japan

[73] Assignees: Akebono Brake Industry Co., Tokyo; Akebono Research and Development Centre Ltd., Saitama, both of Japan

[21] Appl. No.: 921,784

[22] Filed: Oct. 21, 1986

[30] Foreign Application Priority Data

Oct. 28, 1985 [JP] Japan .................................. 60-240763

[51] Int. Cl.4 ........................... B60T 8/44; B60T 8/42; B60T 13/20
[52] U.S. Cl. .................................... 303/114; 303/115; 303/113; 91/519; 60/558
[58] Field of Search .................... 188/181 A; 303/100, 303/113-119, 92; 60/556-560; 91/519

[56] References Cited

U.S. PATENT DOCUMENTS

| 3,729,233 | 4/1973 | Mangold | 303/119 |
| 4,050,748 | 9/1977 | Belart | 303/115 |
| 4,610,484 | 9/1986 | Amberg et al. | 303/100 X |
| 4,629,258 | 12/1986 | Resch et al. | 303/92 |

FOREIGN PATENT DOCUMENTS 2437211  2/1979  Fed. Rep. of Germany ... 188/181 A

Primary Examiner—Andres Kashnikow
Assistant Examiner—Timothy Newholm
Attorney, Agent, or Firm—Toren, McGeady & Associates

[57] ABSTRACT

A brake booster which is capable of appropriately varying the amplifying ratio thereof according to information on a brake pedalling force obtained as an input of a brake system and information on deceleration of the vehicle obtained as an output of the brake system.

2 Claims, 2 Drawing Sheets

BRAKE CONTROL DEVICE

BACKGROUND OF THE INVENTION

1. Field of the Invention

This invention relates to a brake control device adapted for the brake system of a vehicle.

2. Description of the Prior Art

Brake boosters of varied kinds have been proposed for generating braking hydraulic pressure by amplifying a pedalling force on a brake pedal. An example of such brake boosters was disclosed in U.S. Pat. No. 4,443,040.

In these brake boosters, accumulated pressure source is arranged, for example, to transmit hydraulic pressure to a braking hydraulic pressure generating power piston as the back pressure (or working pressure) for the power piston; and transmitted hydraulic pressure control device such as a proportional control valve is arranged to determine the level of the hydraulic pressure from the accumulated pressure source according to a pedalling force applied to a brake pedal. Generally, the amplifying ratio for the braking hydraulic pressure is fixedly determined by the shape of the power piston and the function of the transmitted hydraulic pressure control device. Therefore, in principle, the braking hydraulic pressure resulting from a given degree of a pedalling force exerted on the brake pedal is always unvarying.

However, as well known, the decelerating state of a vehicle which results from brake application does not depend solely on the braking hydraulic pressure. For example, with respect to its relation to the loaded state of the vehicle, the deceleration obtainable from a given value of braking hydraulic pressure is, as well known, inversely proportional to the amount of the load on the vehicle.

In other words, the arrangement of the conventional brake booster to have the above-stated constant amplification ratio is inadequate for stably obtaining a constant degree of vehicle deceleration depending on the pedalling force on the brake pedal. It is desired, for the safety of a vehicle, to have the amplification ratio of the brake booster arranged to be appropriately variable.

SUMMARY OF THE INVENTION

To meet this requirement, therefore, it is an object of this invention to provide a brake booster or control device which is capable of appropriately varying the amplifying ratio thereof according to information on a brake pedalling force obtained as an input of a brake system and information on deceleration of the vehicle obtained as an output of the brake system.

DETAILED DESCRIPTION OF PREFERRED EMBODIMENT

Figure 1:
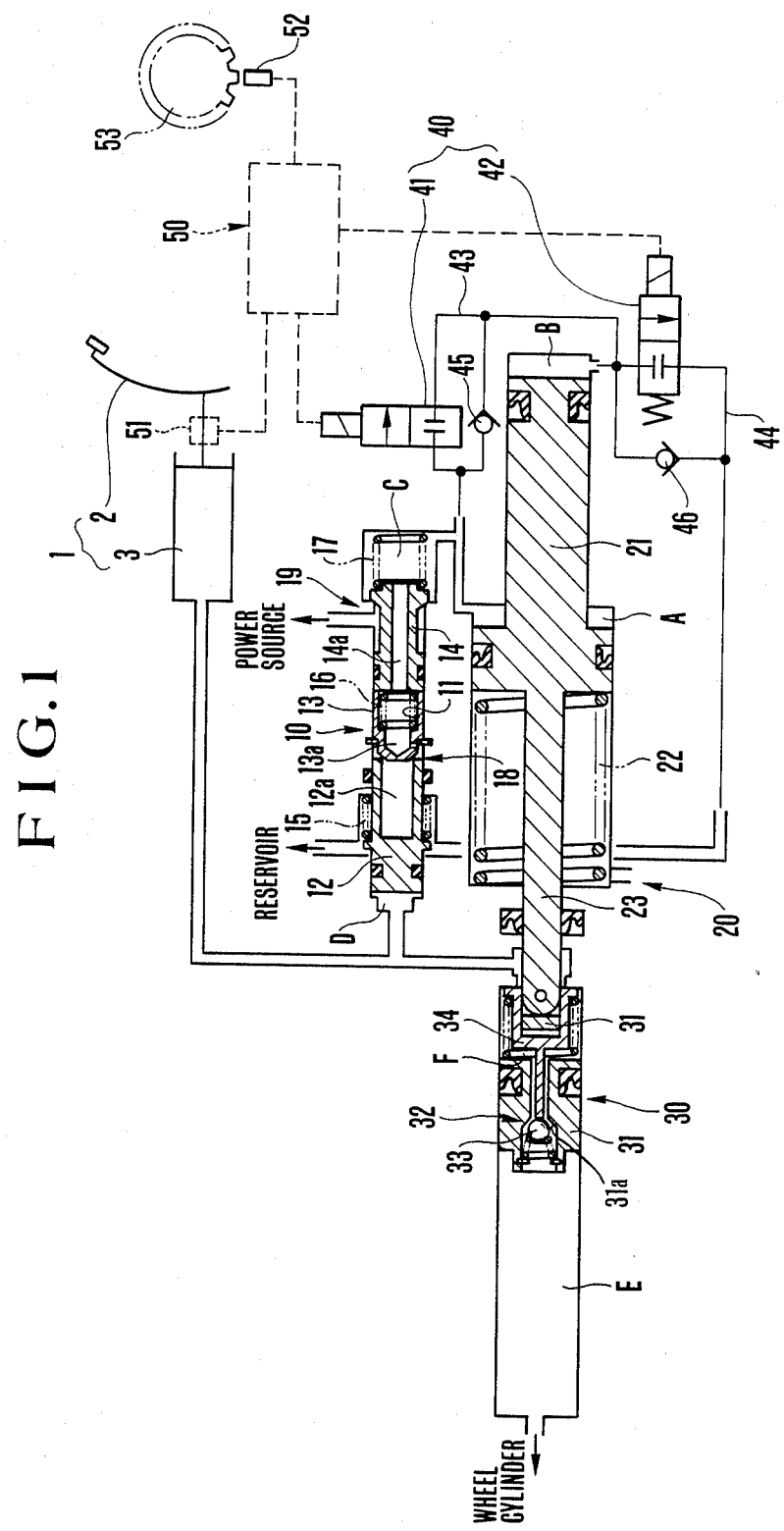
FIG. 1 shows in outline the arrangement of a brake booster arranged as an embodiment of this invention.

An embodiment of the present invention is arranged as described below with reference to the accompanying drawings:

Referring to FIG. 1, a brake booster or control device which is arranged according to this invention comprises: a brake input operation device 1 which consists of a brake pedal 2 and a master cylinder 3; a transmitted hydraulic pressure control valve device 10 which is arranged to receive hydraulic pressure from the master cylinder 3 and to determine, on the basis of the input pressure, a level at which hydraulic pressure is to be transmitted from a power source (or an accumulated pressure source) to an ensuing part; a braking hydraulic pressure generating device 20 which incorporates therein a power piston 21; a fail-safe device 30 which is arranged within the braking hydraulic pressure output system of the braking hydraulic pressure generating device 20 to compensate for the braking hydraulic pressure in the event of a failure in the hydraulic pressure of the power source (the accumulated pressure source); a solenoid operated valve device 40 including a first solenoid valve 41 of a normally closed type arranged to supply and discharge pressure fluid to and from a control fluid chamber B confronting the second pressure receiving face of the power piston 21 of the above-stated braking hydraulic pressure generating device 20 and a second solenoid valve 42 which is also of the normally closed type; and a control circuit 50 which is arranged to perform a change-over operation on opening and closing actions of the solenoid valves 41 and 42 of the solenoid operated valve device 40 according to input signals coming from a stroke sensor 51 which is arranged to detect the pedalling stroke of the brake pedal 2 and a speed sensor 52 which is arranged to detect a wheel velocity through the rotation of a tone wheel 53. The details of these components are as described below.

Transmitted Hydraulic Pressure Control Device 10

The device 10 includes a set of relay pistons 12, 13 and 14 which are disposed within a cylinder 11 and are biased into their initial positions (as shown in FIG. 1) by means of return springs 15, 16 and 17. They are spaced with some clearances kept among them. A hydraulic pressure release valve part 18 is formed by the opposed parts of these relay pistons, which are arranged to open this valve part 18. The relay piston 14 is further arranged such that, in the initial position thereof, it closes a control valve part 19 to prevent the transmitted hydraulic pressure from the power source from being transmitted to a fluid chamber C disposed downstream. The downstream fluid chamber C is allowed to communicate, under the condition as shown in FIG. 1, with a reservoir via fluid passages 13a and 14a provided inside the pistons 13 and 14, the hydraulic pressure release valve part 18 in its open state and a fluid passage 12a provided inside the stem part of the piston 12.

When hydraulic pressure is transmitted, as a result of brake application, to a fluid chamber D which is communicating with the master cylinder 3 and has the end face of the piston 12 facing it, the hydraulic pressure release valve part 18 is first closed by the movement of the piston 12. Following this, the pistons 13 and 14 are pushed and moved to open the control valve part 19. With the control valve part 19 opened, pressure fluid is introduced from the power source to the downstream fluid chamber C. The control valve part 19 comes to close when the hydraulic pressure of the fluid chamber C and that of the fluid chamber D come to balance with each other. In other words, under this condition, the pistons 12, 13 and 14 jointly function as a balance piston between the fluid chambers C and D. Therefore, the hydraulic pressure of the fluid chamber C which is located on the downstream side is determined depending on the hydraulic pressure developed at the master cylinder 3, i.e. the pedalling force exerted on the brake pedal 2.

Braking Hydraulic Pressure Generating Device 20

A stepped power piston 21 is arranged to be opposed to a power fluid chamber A at the end face of its large diameter part and to a control fluid chamber B at the end face of its small diameter part. The piston 21 is biased toward these fluid chambers A and B to be in its initial position by means of a return spring 22. When hydraulic pressure from the fluid chambers A and B come to act on the piston as back pressure, the piston moves against the spring force of the return spring 22. This causes a hydraulic piston 31 which has a fail-safe device 30 contained therein to move accordingly to generate braking hydraulic pressure within a brake fluid chamber E. The brake fluid chamber E communicates with the wheel cylinder of a brake device. The value $P_E$ of the braking hydraulic pressure generated within the brake fluid chamber E is determined jointly by the sectional area $A_E$ of the hydraulic piston 31, the area $A_A$ of the first pressure receiving face of the power piston 21 facing the power fluid chamber A, the area $A_B$ of the second pressure receiving face of the power piston 21 facing the control fluid chamber B, the sectional area $A_F$ of a part 23 of the power piston 21 confronting a fail-safe fluid chamber F, the hydraulic pressure values $P_A$ and $P_B$ of the power fluid chamber A and the control fluid chamber B and the hydraulic pressure value $P_F$ of the fail-safe fluid chamber F which is in communication with the master cylinder 3. In case that the transmitted hydraulic pressure is received solely by the power fluid chamber A, an amplifying ratio is determined by $P_E \times A_E = P_F \times (A_E - A_F) + P_A \times A_A$. When the hydraulic pressure of the power fluid chamber A and that of the control fluid chamber B are equal, the amplifying ratio is determined by $P_E \times A_E = P_F(A_E - A_F) + P_A \times (A_A + A_B)$. Further, while the hydraulic pressure $P_B$ of the control fluid chamber B remains between values 0 and $P_A$, the amplifying ratio is determined by $P_E \times A_E = P_F(A_E - A_F) + P_A \times A_A + P_B \times A_B$. Further, the power fluid chamber A is constantly in communication with the downstream fluid chamber C. The control fluid chamber B is connected to the downstream fluid chamber C via a normally closed type first solenoid valve 41 of the solenoid operated valve device which will be described later and also connected to a reservoir via a normally closed type second solenoid valve 42.

Fail-safe Device 30

The fail-safe device 30 includes a hydraulic piston 31. One end of the piston 31 faces the brake fluid chamber E while the other end faces a fail-safe fluid chamber F which is in communication with the master cylinder 3. A normally open type fail-safe valve 32 is arranged inside the hydraulic piston 31 to permit comunication between the fluid chambers E and F. The fail-safe valve 32 closes when the hydraulic piston 31 is pushed to move to a slight extent by the power piston 21. More specifically, the fail-safe valve 32 in this specific embodiment is provided with a one-way valve ball 33, which is arranged to be normally separated from a valve seat 31a by a locking rod member 34. At the beginning of movement of the hydraulic piston 31, relative movement arises between the piston 31 and the locking rod member 34 to bring the ball 33 into contact with the valve seat 31a.

With the above fail-safe mechanism, when the power piston 21 moves, the hydraulic piston 31 immediately closes the fail-safe valve 32 to have hydraulic pressure generated within the brake fluid chamber E. However, in the event that the power piston 21 fails to move in response to brake application (for example, due to a failure of the power source), the fail-safe valve 32 is kept in an open state to allow the hydraulic pressure generated by the master cylinder 3 to be transmitted to the brake fluid chamber E by virtue of communication between the two fluid chambers E and F.

Solenoid Operated Valve Device 40

The device 40 comprises the above-stated normally closed type first solenoid valve 41 which is inserted in a hydraulic pressure passage 43 provided between the downstream fluid chamber C of the transmitted hydraulic pressure control device 10 and the control fluid chamber B of the braking hydraulic pressure generating device 20; and the normally closed type second solenoid valve 42 which is inserted in another hydraulic pressure passage 44 provided between the above-stated control fluid chamber B and a reservoir. During brake application, the hydraulic pressure of the control fluid chamber B becomes as shown in the following table:

| | | | |
|---|---|---|---|
| The first solenoid valve 41: | closed | opened | closed |
| The second solenoid valve 42: | closed | closed | opened |
| Hydraulic pressure of the control fluid chamber B: | zero or retained | increased | decreased |

The opening or closing operation on these solenoid valves 41 and 42 may be either continuously performed or performed in a pulse-wise manner. Further, in this specific embodiment, one-way valves 45 and 46 are arranged in by-pass arrangements from the above-stated hydraulic pressure passages 43 and 44.

Control Circuit 50

The circuit 50 is connected to a pedal stroke sensor 51 and a speed sensor 52 to receive signals from these sensors. The output terminals of the control circuit 50 is connected to the above-stated solenoid valves 41 and 42 to provide these valves with signals.

The signal from the pedal stroke sensor 51 is reduced to a deceleration value, for example. The reduction value thus obtained is compared with information on the actual deceleration which is obtained from an input signal coming from the speed sensor 52. If the actual deceleration is less than the reduction value, a pressure increasing signal (or a signal for opening the first solenoid valve 41) of the control fluid chamber B is produced. Conversely, if the former is larger than the latter, a pressure decreasing signal (or a signal for opening the second solenoid valve 42) of the control fluid chamber B is produced. The circuit 50 is thus arranged to give a vehicle decelerating degree corresponding to the degree of pedalling action on the brake pedal irrespectively of the loaded condition of the vehicle.

Figure 2:
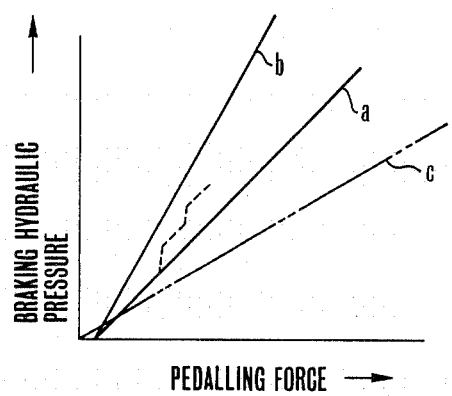
FIG. 2 shows a relation between braking hydraulic pressure and a pedalling force.

FIG. 2 shows a relation between the braking hydraulic pressure obtained by the brake booster arrangement described and the pedalling force applied to the brake pedal. In FIG. 2, a characteristic line a represents, for example, a case where braking hydraulic pressure is obtained solely by the hydraulic action of the power fluid chamber A when the load on the vehicle is zero. A characteristic line b represents, for example, a case where the hydraulic pressure of the control fluid chamber B is equal to that of the power fluid chamber A while the vehicle is in a maximum loaded condition. Another characteristic line c represents braking hydraulic pressure obtained in the event of a fail-safe operation. The illustration clearly shows the amplifying ratio (inclination of the characteristic line) is not solely dependent on the pedalling force exerted on the brake pedal.

This invention is of course not limited to the arrangement of the embodiment described in the foregoing.

In accordance with this invention, a suitable amount of braking pressure can be obtained by feeding back information on the actual vehicle deceleration with a given amount of a pedalling force exerted on the brake pedal. Therefore, the invention has a great utility for improved safety of brake control characteristic.

What is claimed is:

1. A brake control device, comprising:
   a brake pedal,
   a pedal sensor which generates a signal corresponding to depression of said pedal,
   a master cylinder which generates liquid pressure with the depression of the brake pedal,
   a reservoir for a liquid pressure separate from the master cylinder,
   a pressure control device which controls the pressure of a liquid pressure source and generates a liquid pressure corresponding to the liquid pressure generated by the master cylinder,
   a power liquid chamber into which the liquid pressure output from the pressure control device is introduced,
   a control liquid chamber into which the liquid pressure output from the pressure control device is introduced through a first electromagnetic valve,
   a second electromagnetic valve provided in a path connecting between the reservoir and the control liquid chamber,
   a power piston having end faces facing the power liquid chamber and the control liquid chamber, respectively, and being movable by the pressure of each of the chambers,
   a hydraulic pressure piston for transmitting brake liquid to a wheel cylinder with the movement of the power piston,
   speed sensor for detecting a wheel speed,
   a control circuit for controlling the opening and closing of the first and second electromagnetic valves upon receipt of signals from the pedal sensor and the speed sensor to obtain a brake liquid pressure corresponding to a depression force imposed on the pedal, and wherein a brake liquid chamber for generating the brake liquid pressure is provided on one end face of the hydraulic pressure piston, and a fail-safe chamber communicating to the master cylinder is provided on the other end face of the hydraulic pressure piston, said brake liquid chamber and said fail-safe chamber being intercommunicated through a fail-safe valve contained in the hydraulic pressure piston and said fail-safe valve being arranged to close with the movement of the power piston.

2. A device according to claim 1, wherein the power piston is movable within a stepped cylinder with its larger diameter portion facing the power liquid chamber and its smaller diameter portion facing the control liquid chamber.

* * * * *